Nov. 13, 1934. J. L. ADAMS, JR 1,980,308

METHOD AND APPARATUS FOR FORMING MATERIAL

Filed May 23, 1929    10 Sheets-Sheet 1

INVENTOR

Nov. 13, 1934. J. L. ADAMS, JR 1,980,308
METHOD AND APPARATUS FOR FORMING MATERIAL
Filed May 23, 1929 10 Sheets-Sheet 2

Patented Nov. 13, 1934

1,980,308

UNITED STATES PATENT OFFICE 1,980,308

METHOD AND APPARATUS FOR FORMING MATERIAL

James L. Adams, Jr., Youngstown, Ohio, assignor to The Youngstown Sheet & Tube Company, Youngstown, Ohio, a corporation of Ohio Application May 23, 1929, Serial No. 365,323

37 Claims. (Cl. 153—32)

The present invention relates broadly to the art of metal working, and more particularly to a method and apparatus especially adapted for the continuous controlled formation of substantially flat strips or pieces of skelp into tubular form, or substantially tubular form, either for the production of finished articles or as a preparatory step to the performance of a welding operation thereon. The invention as to the subsequent step of welding, contemplates either the production of straight seam or spirally welded tubing.

The term skelp is used herein in its generic sense as definitive of a flat or substantially flat or partially preformed piece of sheet material in the form of a plate, strip, or blank, and is therefore a word of definition and not of limitation.

The terms tubes and tubing are herein used generically as definitive of substantially cylindrical shapes of a generally tubular nature adapted for the production of pipes, tubes, conduits, or the like.

The developments in the art with respect to the formation of metal, and more particularly in connection with the so-called continuous or semi-continuous tube forming machines, require the use of apparatus effective for continuously and uniformly shaping progressive portions of a piece or successive pieces of skelp into predetermined contour. In like manner, the developments in the art of continuous heavy electrical welding require the provisions of means for preliminarily forming cold plate stock so as to adapt it for the performance thereon of the desired subsequent operations.

In accordance with the present invention, I preferably subject successive portions of each piece of skelp to progressive, controlled forming operations effective throughout a distance many times greater than the diameter of the tube being formed, the forming operation from its initiation to its conclusion being of a predetermined progressive definitely controlled character, dependent upon the machine design. While this design may vary in accordance with particular installations, as will hereinafter be more fully set forth, it will in all cases cause progressive portions of the skelp to travel through definitely predetermined paths whereby the exact characteristics of the finished articles are definitely controlled and whereby the existence of concentrated or localized forming operations or zones are obviated, and the forming progressively accomplished through a succession of zones, each of similar or substantially similar characteristics.

In accordance with a preferred embodiment of my invention, I make use of a series of forming dies, hereinafter referred to as curling dies, cooperating either with a similar series of dies or a modified series of dies depending upon the particular results desired, the dies being so arranged that at least one series of dies travels in a path converging in definitely controlled relation toward the axis of the material being formed.

The preferred embodiment of the present invention contemplates the progressive controlled formation in a circular direction of the material being operated upon under such conditions that at no time is the material stressed in a longitudinal direction beyond its elastic limit. As will hereinafter become more clearly apparent, variation of the longitudinal stressing produces variations in the characteristics of the article where the stresses are such as to exceed the elastic limit.

In accordance with one embodiment of the present invention, the longitudinal stressing is divided between different portions of the material in such manner as to keep the maximum stresses in any one portion below the elastic limit of the material.

It has heretofore been proposed in the art to provide opposed series of dies traveling in a generally converging path. This path, however, has not been definitely controlled, so that the material being formed by the dies does not undergo a controlled forming operation from the initiation of such operation to the completion thereof.

In carrying out the present invention, I preferably provide an apparatus of such nature as to provide an initial forming zone and a final forming zone with an intermediate forming zone therebetween, the intermediate forming zone being of a length many times greater than the diameter of the tube being formed and continuously exerting a definitely controlled progressive forming action on the material. The final forming zone is followed by a relief zone in which the forming means are gradually relieved from forming engagement with the formed tube, the entire structure being such that all parts of the driving mechanism are relieved from forming pressures at this point.

In the accompanying drawings there are shown for purposes of illustration only, certain preferred embodiments of the present invention.

In the production of a forming machine suitable for operation on comparatively heavy skelp while in cold condition, and particularly where it is desired not to incur the expense of preliminarily pickling the skelp, the guiding and/or supporting surfaces of the apparatus must be so disposed as to be effectively protected from the action of scale projected from the skelp during the forming operations thereon. The present invention provides an apparatus possessing desirable features in this respect.

It is also desirable from the standpoint of smoothness of operation and length of life of the parts, to provide a construction in which the wear on the guiding and supporting surfaces may be distributed over a considerable area, and thereby obviate excessive wearing over relatively small or substantially localized areas. It is likewise of advantage to provide an apparatus having relatively simple and comparatively inexpensive wearing insert parts capable of being easily renewed or replaced, whereby the maintenance cost of the apparatus is reduced to a minimum, and whereby the "change over" of parts to adapt the apparatus to the handling of skelp of different sizes may be expeditiously and inexpensively accomplished.

Figures 1 to 4 of the drawings relate primarily to an apparatus adapted to accomplish a uniform forming operation on the opposite longitudinal edges of a piece of skelp, to thereby gradually bring the edges into substantially abutting relationship and enable said edges to be welded or otherwise united in this relationship, for the production of straight seam welded tubing.

Figure 5:
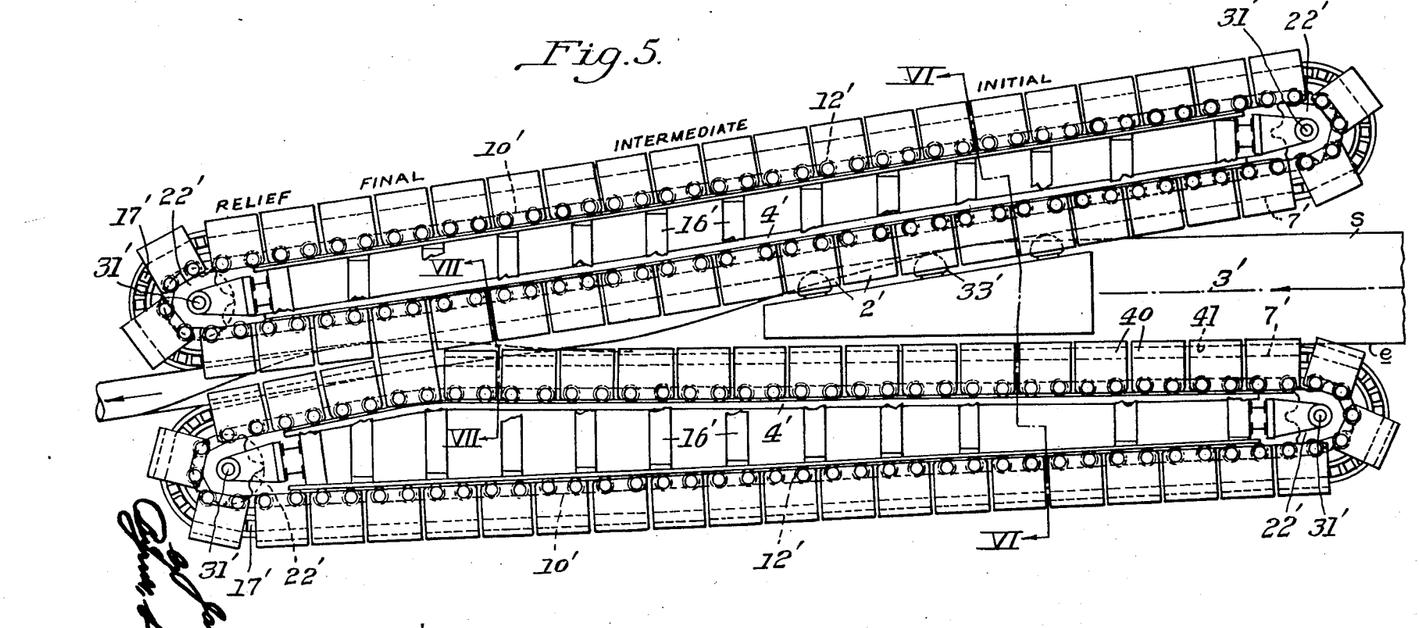
Figure 5 is a view similar to Figure 1, illustrating a modified embodiment of the invention adapted for the production of spirally formed articles.
Figure 13:
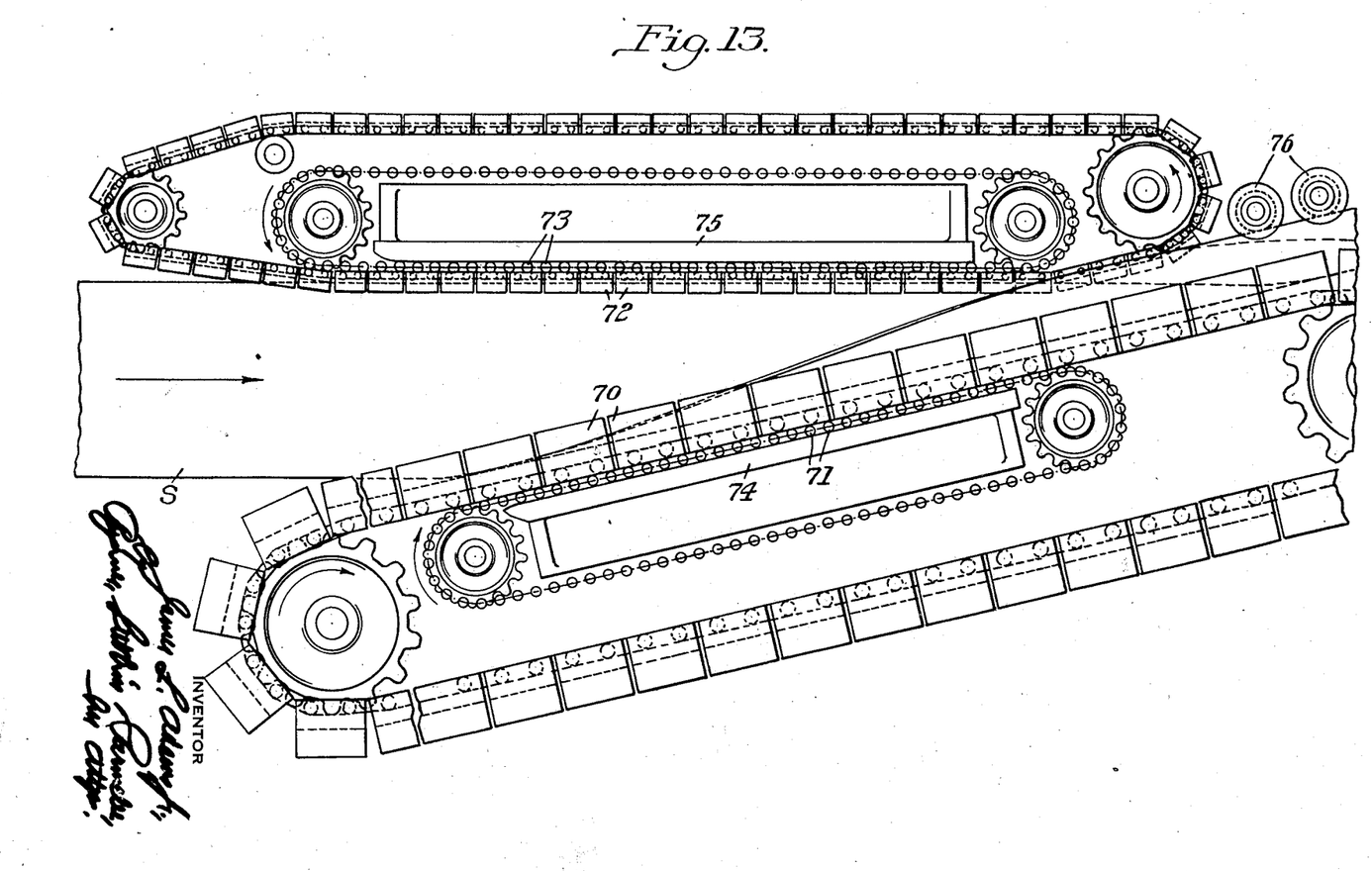
Figure 13 is a diagrammatic top plan view illustrating another embodiment of the invention adapted for the production of spiral tubing.
Figure 14:
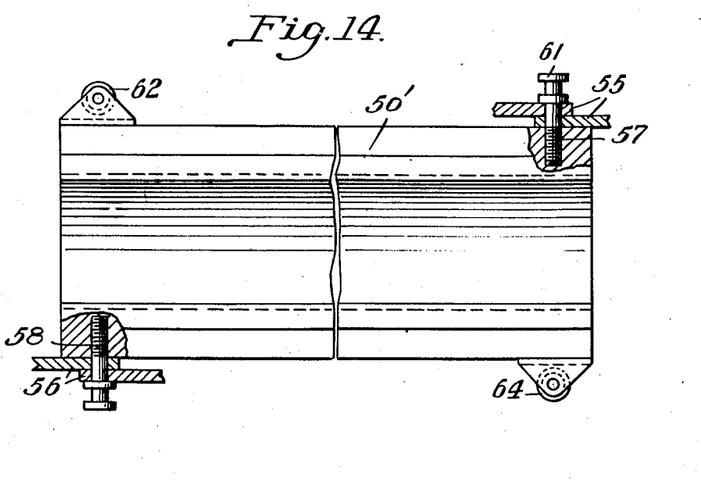
Figure 14 is a detail view partly in elevation and partly broken away illustrating in detail one of the dies of Figure 12.

Figures 5 and 13 relate primarily to a somewhat similar apparatus differing from that referred to in that the forming up is confined to one edge, whereby the skelp is gradually bent into spiral form with the successive convolutions in abutting relationship ready for the performance of a welding or other uniting operation to produce spirally welded or joined tubing.

In accordance with the embodiment relating to the simultaneous forming of opposite edges of a piece of skelp, there are preferably provided curling dies of similar construction and disposed or arranged for simultaneous operation on the opposite edges of such skelp. Inasmuch as the two sides of the apparatus in such case are of substantially identical construction, the detail description of the parts, for purposes of brevity, will be confined to the parts on one side of the longitudinal center line.

Figure 1:
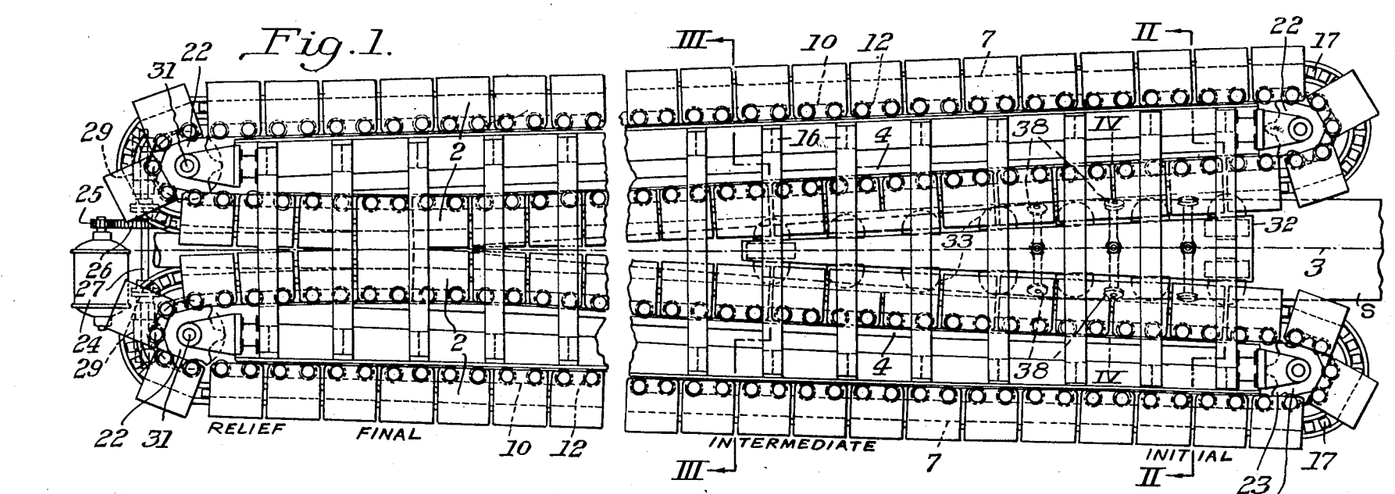
Figure 1 is a top plan view of one form of apparatus in accordance with the present invention adapted for the simultaneous formation of opposite sides of a piece of skelp.

In Figure 1 there are illustrated two series of curling dies 2, symmetrically disposed with respect to a center line 3, which center line represents not only the line of travel of the piece of skelp S being formed, but also the longitudinal center line of such skelp. The two series of dies are arranged in gradually converging relationship, as clearly illustrated in Figure 1, whereby the free space between the opposite faces of the opposed dies gradually decreases in width, thereby compelling a piece of skelp traveling therebetween to gradually undergo a change of contour such that it adapts itself to the gradually changing spacing between the curling dies.

The arrangement of dies is such as to provide an initial forming zone, a final forming zone, and an intermediate forming zone, followed, with reference to the direction of travel of the skelp, by a relief zone, these zones being appropriately indicated in Figure 1.

Cooperating with each series of curling dies and extending from the initial zone into and preferably through the final forming zone, is a supporting means 4, herein illustrated as comprising upper and lower I-beams 5, having accurately machined supporting surfaces 6 formed or mounted thereon. By reference more particularly to Figure 1, it will be noted that the path of these surfaces is such as to provide converging portions extending entirely through the initial forming zone and the major portion of the intermediate forming zone, the paths thereafter being gradually curved through a portion of the intermediate forming zone and the major portion of the final forming zone to thereby effect a gradual change in the direction of travel of the curling dies approaching a parallel relation to the tube. The continuity of the supporting surfaces is such as to continuously control the movement of the forming dies from the commencement of the initial forming operation to the completion thereof in such manner that a progressively and continuously controlled forming operation is effected.

Figure 2:
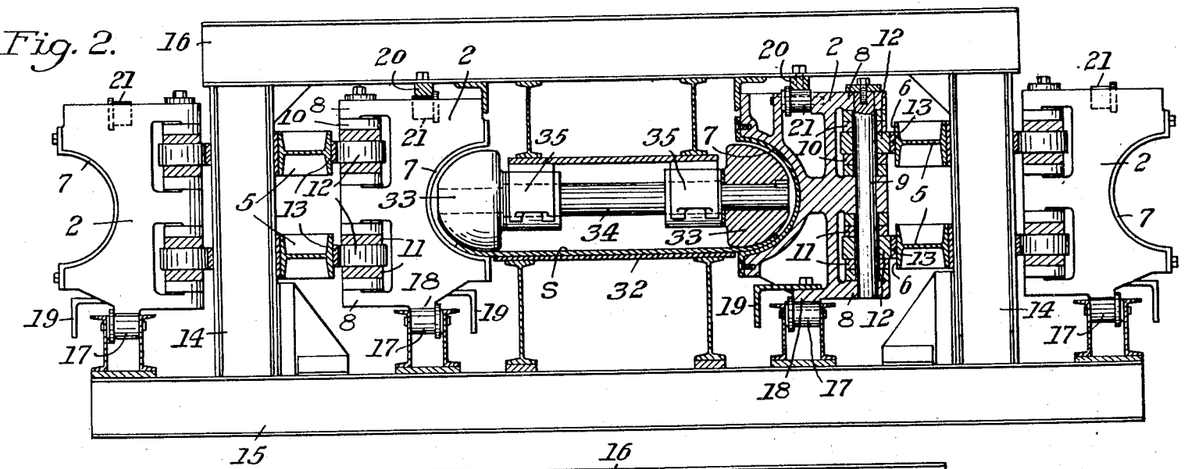
Figure 2 is a transverse sectional view on the line II—II of Figure 1, looking in the direction of the arrows.
Figure 3:
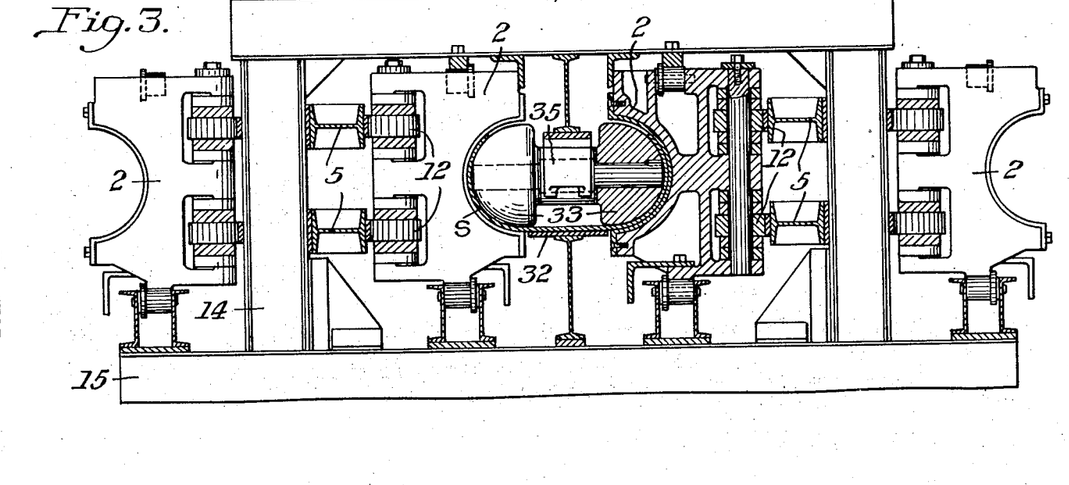
Figure 3 is a transverse sectional view on the line III—III of Figure 1, looking in the direction of the arrows.

As illustrated more particularly in Figures 2 and 3 of the drawings, each of the dies 2 is formed with a substantially semi-circular working or forming face which is preferably provided with a removable and replaceable liner 7.

Each of the dies provides a plurality of bearings 8 for the reception of chain pins 9 extending through the links 10 of an upper chain and similar links 11 of a lower chain. Intermediate the series of links constituting both the upper and the lower chain are rollers 12, which rollers are adapted to cooperate with roller plates 13 on the surfaces 6 in such manner that the dies are caused to travel in a definitely controlled path.

The guide beams 5 are in turn supported in any desired manner by uprights 14 secured to the base 15 and joined together at their tops by transverse braces 16. Carried by the base 15 for supporting the dies throughout their entire path of travel are rollers 17, the rollers directly co-operating with rails 18 on the dies. These rollers are in turn shielded from the passage thereto of foreign material such as scale by suitable guard plates 19.

Carried by the transverse braces 16 is a second rail 20, cooperating with a series of rolls 21 carried by the dies.

Suitably supported adjacent each end of the machine are spaced sprockets 22, the spacing between the sprockets in the direction axially thereof being equal to the distance between the respective rollers 12 on the chain pins 9. The thickness of the individual sprocket teeth 23 is preferably substantially equal to the width of the rollers 12, whereby the sprocket teeth fit closely between the links of the chains and serve to accurately guide and support the chains and their associated parts during their travel therearound.

Figure 15:
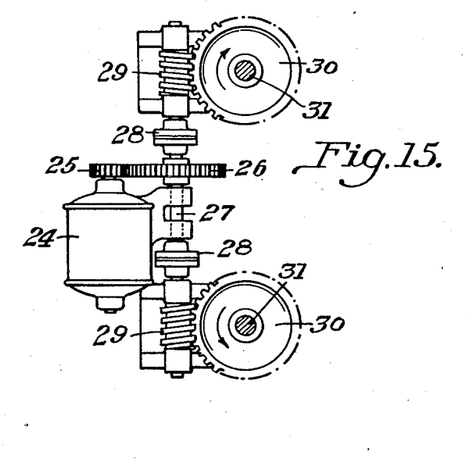
Figure 15 is a detail view of the driving mechanism illustrated at the left hand of Figure 1 of the drawings.

For driving the chains 10 and 11, there may be provided a motor 24 having its driving pinion 25 meshing with a gear 26 on the back gear shaft 27. This shaft adjacent its opposite ends is provided with flexible couplings 28 suitably connected to worms 29 meshing with worm wheels 30 on the respective sprocket shafts 31 or an intermediate shaft (not shown), whereby the shafts are driven in unison during the operation of the motor.

In order to obtain the desired variations of speed during the operation of the apparatus as may be necessitated for skelp of different widths and thicknesses, I preferably utilize a variable speed motor. In addition to this, the construction and mounting of the gears 25 and 26 is such that they may be interchanged at will to permit the substitution of gearing giving a different gear ratio, thereby enabling a wide range of driving speeds to be obtained.

Cooperating with the curling dies throughout the initial forming zone and a portion of the intermediate forming zone is a skelp support 32, this support being so mounted that its upper surface whether in the form of a plate, roller or series of rolls, lies substantially in the plane of and constitutes a continuation of the working and forming faces of the dies whereby the skelp is accurately fed into the forming passes thus provided.

At spaced intervals throughout the initial forming zone and a portion of the intermediate forming zone, there may be provided pass defining rolls 33, carried by shafts 34 mounted in suitable bearings 35, suitably supported from the transverse braces 16.

I have found in actual practice that there is a tendency for the skelp acted upon by the curling dies to assume a more or less non-symmetrical position with respect to the machine axis unless the skelp is held positively in a central position. In order to maintain the proper position of the skelp, there may be provided intermediate the pass defining rolls 33, any desired number of skelp centering mechanisms. As illustrated more particularly in Figure 4 of the drawings, each of these mechanisms comprises a support 36 depending from one of the transverse braces 16 and carrying at its lower end a transversely extending mounting 37 on the end of which are mounted guard or flange rollers or sliding shoes 38, so located as to engage and definitely position the opposite edges of the skelp. These guiding means being uniformly disposed, maintain the skelp in its proper central position.

Figure 4:
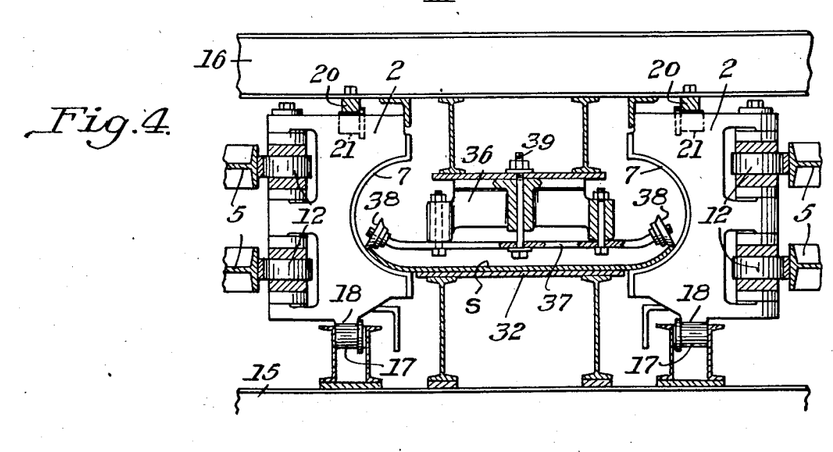
Figure 4 is a partial sectional view on the line IV—IV of Figure 1, illustrating one form of edge holding means.

By suitably choosing the material of the stationary mounting 37 and its width and thickness, the desired slight amount of flexibility may be imparted thereto to properly hold the guiding means 38 in the desired position while permitting such a slight movement thereof, as may be necessitated by reason of variations in the edges of the skelp. The edge adjustment of the guiding means may in turn be varied by an adjusting screw 39, as will be clearly understood. The number of centering and positioning means may be increased or diminished at will, as will be clearly apparent, whereby the skelp may be held against undesirable movement throughout the entire initial stages of the curling up operation.

With a machine of the character described, as the free width or spacing between the faces of the opposing dies gradually decreases, the side edges of the skelp will be deflected upwardly, as illustrated, for example, in Figure 2, this figure representing a condition in the initial forming zone. This curling up operation will be continued gradually until the edges of the skelp have been brought into abutting relationship in the final forming zone. The distance through which the forming up operation is accomplished depends upon the angle of convergence of the respective series of dies. By making this angle or path of convergence more acute and correspondingly lengthening the parts of the machine, the curling operation can be extended over a considerable distance, while by making the angle of the path of convergence more obtuse, the curling operation can be accomplished in a shorter distance. The angle of convergence is preferably selected at all times with respect to the characteristics of the material being formed in such manner as to obviate subjecting such material at any point to longitudinal stresses of such magnitude as to exceed the elastic limit thereof, and impart a permanent set thereto. With an obtuse path of convergence, or with a machine operation in which the curling up operation is concentrated within a relatively short zone, the curling up of the edges necessarily subjects the fibers of the material, and particularly those approaching these edges, to stresses in the direction longitudinally of the material, in addition to the normal circularly disposed bending stresses.

If this longitudinal stress exceeds at any point the elastic limit of the material, the formed article will have a camber imparted thereto, the extent of which is governed by the amount of stress in excess of the elastic limit. On the other hand, by a continuously controlled progressive curling operation, effective over a considerable distance and through an acute angle of convergence, the material is at no time subjected to such a stress longitudinally thereof as to exceed the elastic limit. By providing a gradually curved path adjacent to and preferably extending within the final forming zone, the change in the direction of travel of the curling dies is effected so gradually as to obviate subjecting the material to an abrupt change of contour such as to produce a longitudinal stress in excess of the elastic limit.

Where the plant conditions, or where the characteristics of the material being formed, are such as to dictate the advisability of a more obtuse angle or path of convergence, or where either the conditions of operation or the characteristics of the material are such that regardless of the angle or path of convergence, the elastic limit of any portion of the material is exceeded, or where by reason of other conditions it may be desirable to produce a modified operation of the apparatus disclosed herein, the location and arrangement of the rollers 17 and rails 20 may be such as to cause the dies to travel through a path gradually curved with respect to a horizontal plane.

In such cases, the path of travel of the material will be such as to subject the central portions of the web thereof to a longitudinal stretching action of the order of the stretching action to which the edge portions are subject by reason of the curling up operation.

By increasing the amount of this counter curvature in this manner, the longitudinal stretching may be more nearly uniformly divided as between the respective portions of the skelp, an adjustment of the curved path enabling this stretching to be varied within any limits desired. In actual operation, the characteristics of the path will be so chosen with respect to the angle or path of convergence and the characteristics of the material as to approximately divide the stretching action between the edge portions and the central portion of the skelp, or at least in such manner as to always insure a sufficient longitudinal stress in the central portion of the skelp as to produce a set below the center line of the finished tube which will substantially equal any set above the center line of such tube by reason of longitudinal stretching of the edge portions, so that the finished tube will be free from camber.

Where the conditions of operation are such that the forming up operation may be followed by a subsequent straightening operation, any camber imparted to the tube during the forming up operation may be subsequently removed therefrom.

The present invention, however, by a proper choice of the path of convergence, or by a proper correlation of the path of convergence to the downward deflection and consequent stretching of the central portion of the skelp, enables any desired final condition in the tube to be obtained without a subsequent operation. In normal conditions of operation, I have found it desirable to so choose the path of convergence that the distance through which the forming up operation is accomplished will be more than twenty times, and preferably at least not less than thirty times, the diameter of the finished tube, although this relationship may be varied under the conditions herein referred to.

By reference more particularly to Figure 1 of the drawings, it will be noted that from the final forming zone the curling dies gradually move outwardly away from the axis of the formed up tube. This zone, through which a gradual opening up of the dies is accomplished, has hereinbefore been termed the relief zone. In forming up heavy stock cold, it has been found that such tremendous pressures are exerted that the curling dies have a tendency to become clamped onto the formed tube to some extent, whereby if an attempt is made to remove them in a short distance of travel, as in passing over the sprockets, a considerable strain is exerted on the rotating parts of the machine. By effecting a gradual preliminary outward movement of the dies throughout an appreciable distance, however, the dies are easily and uniformly released and removed from contact with the tube before they are pulled bodily outwardly by the passage around the sprockets themselves.

Figure 6:
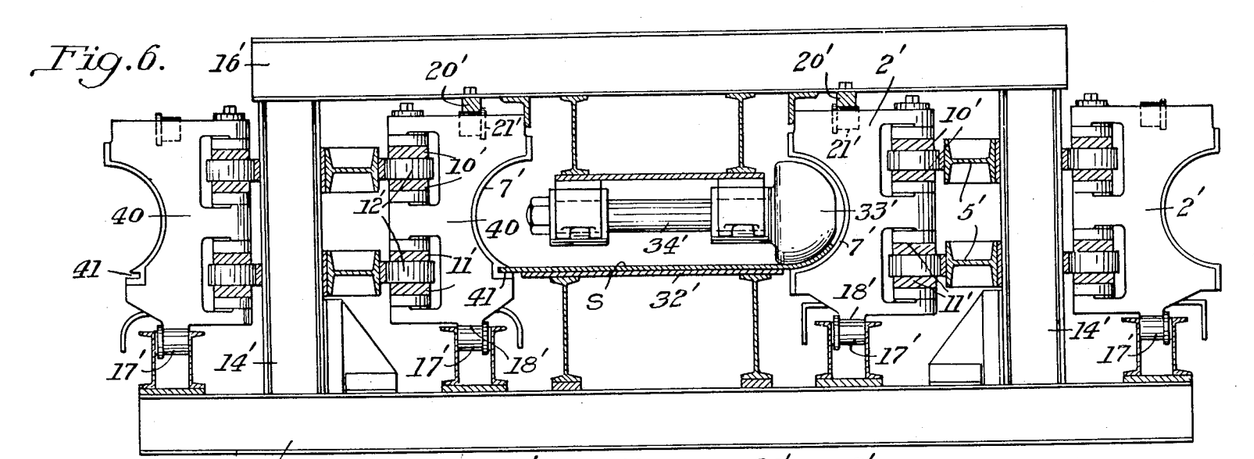
Figure 6 is a transverse sectional view on the line VI—VI of Figure 5.

While an apparatus of the character just described is effective for uniformly forming up the opposite edges of a piece of skelp, thereby bringing such edges into straight seam abutting relationship such as would permit the later performance of a welding operation thereon, it is sometimes desirable to form skelp in such manner that it may subsequently be spirally welded. In such case, I preferably utilize an apparatus of the general character disclosed in Figures 5, 6 and 7. Inasmuch as the operation of the apparatus on one side of the longitudinal center line of the skelp corresponds to apparatus already described in detail, I have designated corresponding parts therein by reference characters as hereinbefore used, but having a prime (') affixed thereto.

In this embodiment, the single series of curling dies cooperates with a series of edge holding dies 40, conveniently carried in the same manner as the dies 2', but so arranged as to travel in a line substantially parallel to the center line 3' of the skelp.

Each of the dies 40 may be of a construction similar to that of the dies 2 with the exception that they are preferably provided with an edge holding recess 41 therein, effective for engaging and preliminarily holding one edge of a piece of skelp during the performance of a forming up or curling operation on the opposite edge thereof. The edge holding recesses in the respective dies are preferably in axial alignment and of such dimensions as to maintain the edge of the skelp engaged thereby in a predetermined line.

As a piece of skelp is pulled through a forming machine of the character herein illustrated, it will be apparent that one edge thereof is gradually curved upwardly and inwardly in such manner that as the skelp finally emerges from the machine, it is formed into the desired shape for the performance thereon of a spiral welding operation.

An apparatus of this character possesses an advantageous characteristic of operation which is not present in a machine of the character first described. With a machine of the later type, adapted for a spiral formation of skelp, each portion of the skelp throughout the entire width thereof is caused to travel over corresponding portions of the entire face of successive dies. By reason of this operation, localized wear in any portion of the working faces of the dies does not effect the circularity of the finished article. By reference more particularly to Figure 7 of the drawings, it will be apparent that the edge E has been caused to travel over the entire face of one of the forming dies 2' in assuming the position illustrated in this figure.

Figure 7:
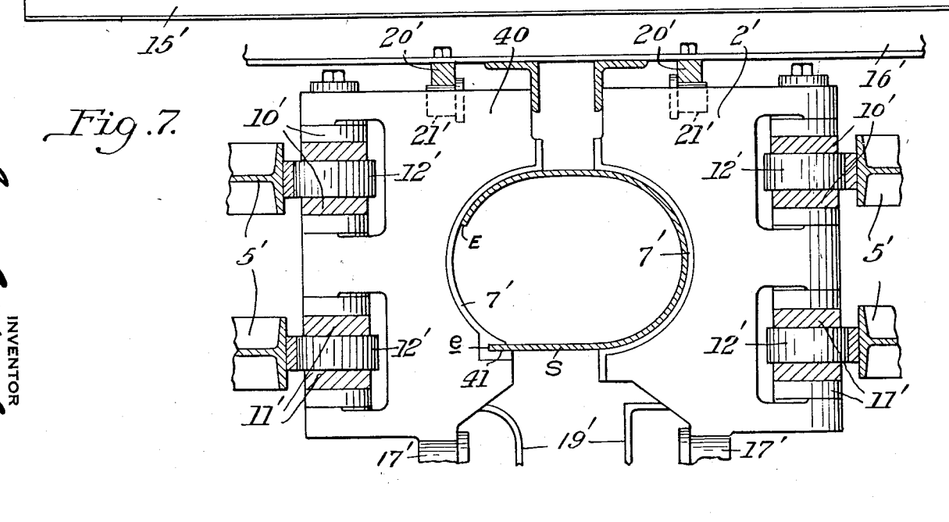
Figure 7 is a partial transverse sectional view, on the line VII—VII of Figure 5.

Continued travel of the skelp through the machine will cause the opposite edge e previously held in the recesses 41 to leave the recesses and travel over the working faces of the dies 2' in exactly the same manner that the edge E previously traveled thereover. In this manner, every portion of a piece of skelp is subjected to exactly the same forming conditions and absolute circularity in the final product is insured.

This operation possesses a further advantage that at no time does the tube undergo a change of contour such as exists in a machine of the construction shown in Figure 1 at the time the tube passes from the intermediate forming zone into the final forming zone and which change of contour may be referred to as a "bottle neck condition". While the curvature of the paths of travel of the dies, as illustrated in Figure 1, and as before described in detail, minimizes the "bottle neck condition", it necessarily exists to some extent with a machine of that type, while with a machine of the type of Figures 5, 6 and 7, the condition is entirely eliminated. With a spiral forming machine, a given curvature having once been imparted to a portion of the skelp, that curvature is substantially maintained thereafter without any material deviation.

Figure 8:
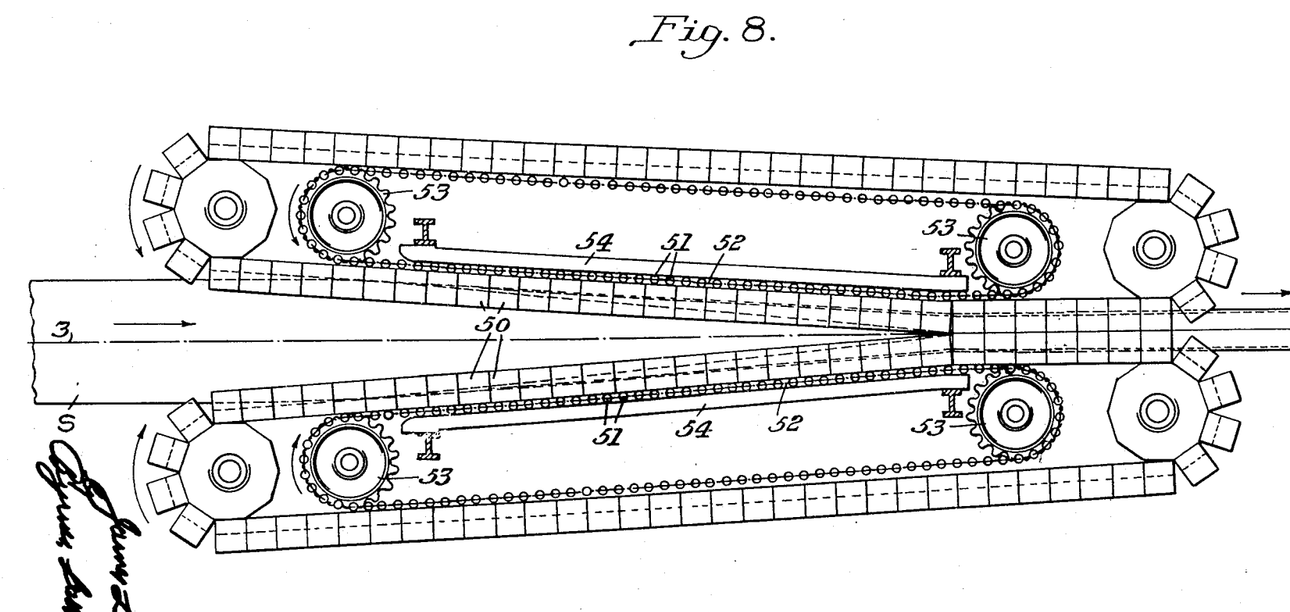
Figure 8 is a view similar to that of Figure 1, illustrating another embodiment of the present invention.
Figure 9:
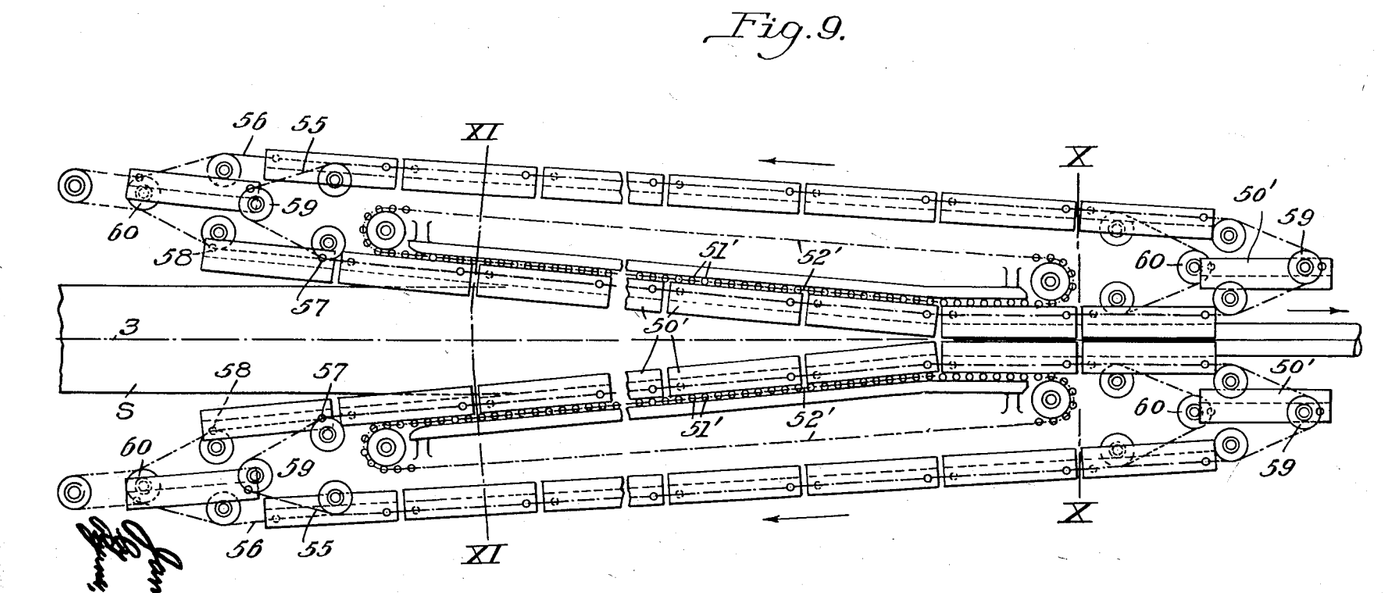
Figure 9 is a view similar to Figure 8, showing still another form of the invention.

In Figure 8 of the drawings, there is illustrated a slightly modified embodiment of the straight seam form type of machine. In accordance with this embodiment of the invention there are provided suitably carried dies 50 generally similar to the dies 2, which dies, however, cooperate with backing-up rollers 51 individually carried by sprocket chains 52 cooperating with sprockets 53.

The rollers 51 are caused to pass over a platen 54 corresponding to the guiding and supporting means 4 previously described, and constituting means for continuously and accurately controlling the paths of travel of the curling dies from the commencement of a forming operation to the conclusion thereof. From an inspection of this figure in which the guiding and supporting means 54 are indicated as having a smaller radius of curvature adjacent the final forming zone than that illustrated in Figure 1, the "bottle neck condition" before referred to becomes more clearly apparent. The exact contour of the supporting and guiding means 54 may, however, be varied in accordance with the invention as herein set forth.

In Figures 9, 10, 11 and 12, I have illustrated still another embodiment of the invention, generally similar to that just described, but differing therefrom in that the dies 50' cooperating with the backing-up rollers 51 are of materially greater length than the corresponding dies 50, and are supported for travel in a different manner during the return or idle portion of the cycle. In accordance with this embodiment of the invention, there are provided upper and lower sprocket chains 55 and 56, respectively, which chains at their end portions are offset longitudinally one with respect to the other, as clearly shown in Figures 9 and 12. Each of the dies is in turn provided with upper and lower studs 57 and 58, respectively, cooperating with the upper and lower chains, the respective studs being located adjacent the opposite end portions of each of the dies in order to conform to the offsetting of the chains and permit the dies to travel with the chains around the end sprockets 59 for the upper chain and the end sprockets 60 for the lower chain.

Figure 10:
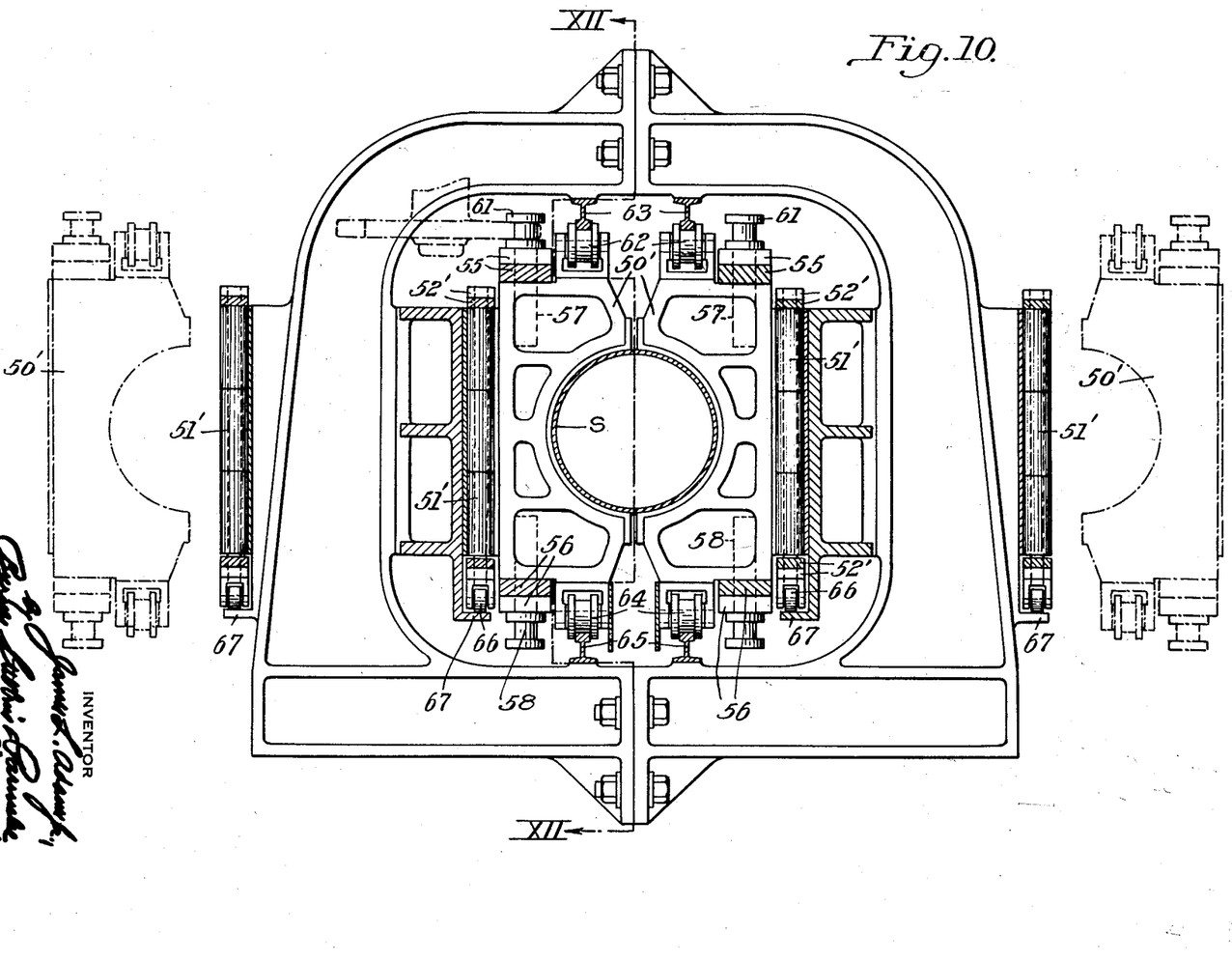
Figure 10 is a transverse sectional view, on the line X—X of Figure 9, illustrating detail structure of the forming apparatus.
Figure 11:
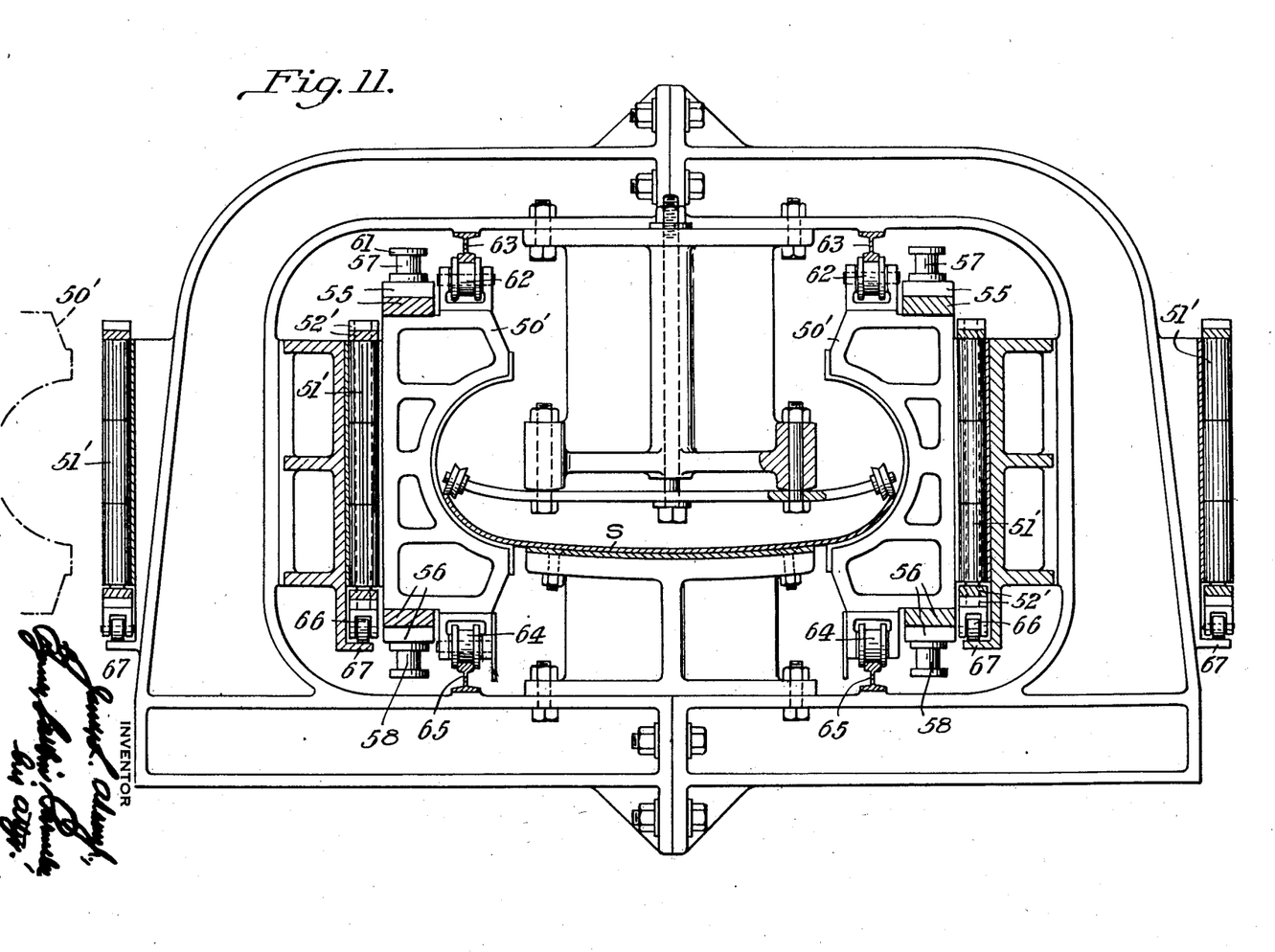
Figure 11 is a view similar to Figure 10, but on the line XI—XI of Figure 9.
Figure 12:
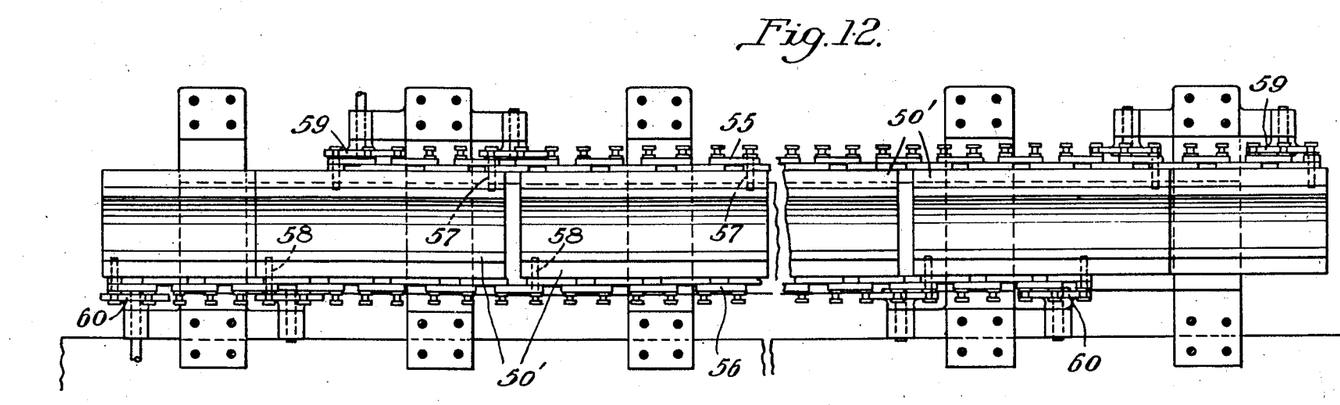
Figure 12 is a longitudinal sectional view on the line XII—XII of Figure 10, looking in the direction of the arrows.

As illustrated in Figures 10 and 11, the studs 57 and 58 are provided with heads 61 of such contour as to cooperate with the sprocket teeth on the sprockets 59 and 60. This construction not only serves as a driving means for the chains, but also as a supporting means therefor during the time that the chains are traveling therearound.

The construction of the parts is otherwise generally similar to the construction described in connection with Figures 1 to 4, both inclusive, in that each of the dies is positively controlled in its direction of travel lengthwise of the machine in a vertical direction. In this embodiment, however, the dies are illustrated as carrying upper rollers 62 cooperating with rails 63 and also rollers 64 cooperating with rails 65. The chains 52' for the backing-up rollers 51' are also illustrated as provided with supporting rollers 66 traveling on the track 67 for maintaining the backing-up rollers in cooperative relation to the backs of the dies during the machine operation.

In Figure 13 there is illustrated diagrammatically a modified embodiment of the invention similar to that of Figure 5 but differing therefrom in substantially the same respects in which the embodiment of Figure 8 differs from the embodiment of Figure 1. In this form of the invention, the curling dies 70 cooperate with thrust rollers 71, while the edge holding dies 72 cooperate with thrust rollers 73. In both cases the thrust rollers are caused to travel over guiding and supporting means 74 and 75, respectively, such as to continuously control the path of travel of the respective dies.

After the spirally curved skelp leaves the edge holding dies 72, it may be engaged by one or more concave backing-up rollers 76, causing the tube to continue its travel in a predetermined line throughout the active forming course of the main curling dies 70 until such time as the edge portions previously engaged by the holding dies 72 have been caused to travel over the full face of the curling dies.

With all of the forms of my invention, the curling dies over which the edges of the skelp are caused to travel may be provided with replaceable and renewable insert sections of the character illustrated at 7 in Figures 2 and 3. These insert sections are preferably reversible end for end in such manner that after a predetermined period of operation, wear may be equalized on the inserts by effecting such an end for end reversal thereof. This feature is also of importance in that by the substitution of inserts of different thicknesses, the machine is adapted for cooperation with skelp of different widths and thicknesses. As the inserts utilized for the production of relatively small diameter tubing become worn, they may be refaced to form bushings or inserts for the next larger size tubing, thereby eliminating material waste. It is thus seen that this feature not only enables equalization of wear, but adapts the machine with a minimum "change over" expense to the production of many different sizes of tubes. At the same time, it enables the parts when unduly worn so as to be ineffective for the production of one size of tubing, to be replaced and then reused, after reboring, for the production of the next larger size.

The continuous controlling of the dies from substantially the commencement of the forming operation to the completion thereof enables the apparatus to be utilized with skelp of any commercial thickness, and adapts the same to the forming up cold of materially thicker skelp than it has heretofore been possible to handle.

The control of the curling dies in the manner referred to also enables the machine to be operated for the production of successive tubes free from camber, this constituting a unique departure from any prior art structure.

It will be apparent to those skilled in the art that all of the forms of the invention herein illustrated provide means for properly centralizing a piece of skelp during its travel through the machine. With the spiral forming machine, the centralizing is accomplished by the edge holding dies. With the straight seam forming machine, the centralizing of the skelp is accomplished not only by the pass defining rolls, which prevent any buckling or cobbling of the skelp, but also by the edge holding means which are positioned intermediate the pass defining rolls. By means of this construction, a piece of skelp is held at all times in intimate contact with the curling or forming surfaces of the dies, and in such relation thereto that accurate forming up is accomplished.

All of the embodiments of the present invention also provide a forming machine in which the forming from its initiation until its completion is under positive control.

Such a positive control cannot be obtained by the use of a series of successive roll passes, nor can it be obtained by the use of forming elements which are not caused to travel in a definitely predetermined path of such nature that a deviation therefrom is positively precluded. The present invention, therefore, not only embodies accurate control or centralizing of successive pieces of skelp with respect to the curling dies, but it also insures positive and continued control of the curling dies themselves, so that throughout the initial forming, the intermediate forming, and the final forming zones, there is obtained the desired progressive and definitely controlled forming up operation.

The feature of producing a predetermined deflection of a central portion of the skelp in order to entirely or partially offset the effects of the stretching in a longitudinal direction of the edge portions also constitutes a feature of control adaptable to a straight seam forming machine of any of the types illustrated, and provides means for simultaneously forming up a tube and compensating for any tendency of the same to assume a curved or cambered condition.

While I have herein illustrated certain preferred embodiments of the invention, it will be understood that changes in the construction and operation of the various parts may be made without departing either from the spirit of my invention or the scope of my broader claims.

I claim:

1. Forming apparatus, comprising means adapted to cooperate with the opposite edges of a piece of skelp, said means extending in gradually converging relationship, and at least one of said means comprising a series of longitudinally traveling curling dies adapted to progressively curve one edge of the skelp into the desired shape, and driving mechanism for said last mentioned means, there being means within the zone of operation of said dies for positioning the skelp relatively to said curling dies and maintaining the same in desired position, to insure uniform forming of the skelp.

2. Forming apparatus, comprising means adapted to cooperate with the opposite edges of a piece of skelp, said means extending in gradually converging relationship and comprising opposed series of longitudinally traveling curling dies adapted to progressively curve the edge portions of a piece of skelp upwardly and then inwardly, driving mechanism for said dies, and means within the zone of operation of said dies for positioning the skelp relatively to said dies and maintaining the same in desired position.

3. In the method of forming tubular articles, the steps comprising feeding a piece of skelp into engagement with forming means, continuously moving said forming means while in contact with the skelp to progressively and uniformly form one edge thereof by causing such edge to slide over successive portions of such forming means, and holding the opposite edge during such sliding operation.

4. In the method of forming tubes, the steps comprising subjecting a piece of skelp to a circular forming and longitudinal edge stretching operation, and minimizing the effects of such edge stretching by subjecting an intermediate portion of the skelp to a longitudinal stretching operation.

5. In the method of forming tubes, the steps comprising progressively curving up the opposite edges of a piece of skelp, and subjecting an intermediate portion of the skelp to a stretching operation in a longitudinal direction.

6. In the method of controlling camber in a tube, the steps comprising forming the edge portions of the tube and simultaneously subjecting an intermediate portion to a longitudinal stress.

7. A forming machine for metal plates, comprising a series of concave forming members, means for causing said members to converge at an acute angle toward the longitudinal axis of a plate being operated upon, said means including an extended roller support for said forming members along the general line of their convergence, and other means for holding portions of the plate in substantially intimate initial contact with the forming surface of said members.

8. A forming machine for metal plates, comprising a series of concave faced forming dies, means for progressing the same longitudinally as a unit to converge the same at an acute angle over a predetermined path toward the longitudinal axis of a plate being operated upon, said means including an extended low friction back support for said dies during a considerable portion of their convergent travel, and other low friction means for holding said plate initially in fairly close proximity to the entering edges of said forming dies.

9. A machine for forming metal plates, comprising a series of lined concave faced forming dies, end sprockets at different distances from the longitudinal axis of the machine around which said dies travel as a unit during a feeding movement of the plate being operated upon, low friction means for taking up the rearward thrust from said forming dies intermediate said end sprockets, and means for initially holding the edge portions of a plate in fairly close proximity to the entering side of said forming dies.

10. A machine for forming metal plates, comprising concave faced forming dies, backing rollers therefor arranged to insure angular longitudinal travel of said dies such as to effect a slow convergence thereof toward the longitudinal axis of the machine means for initially holding a plate in fairly intimate juxtaposition to the entering side of said forming dies during a predetermined fraction of the travel of said plate over the face of said dies, and means for guiding said plate in a substantially axial direction while in operative contact with said dies.

11. In a machine for forming metal plates, a series of concave forming members, means for producing a gradually controlled convergent travel of said members toward the longitudinal axis of a plate being operated upon, with the plate substantially tangent to one working edge of said members, further means for initially holding said plate in close juxtaposition to said edge, and means for guiding said plate over a of said members.

12. A forming machine for metal plates, comprising a series of concave curling dies, means for giving continued low friction back support to said dies and establishing a path of travel thereof converging at an acute angle toward the longitudinal axis of a plate being operated upon, means for moving said dies, means for initially supporting a plate so that its substantially flat elements will be approximately tangent to the entering edge of said curling dies, means for holding the die entering portions of said plate in close juxtaposition to said entering edge, and means for longitudinally guiding a plate through a predetermined course through said dies.

13. A forming machine for metal plates, comprising a series of concave curling dies, means determining the path of travel of said curling dies to cause the same to converge at an acute angle toward the longitudinal axis of a plate being operated upon, low friction means cooperating therewith for absorbing the working thrust of said dies, and means operative to cause the substantially flat elements of a plate to enter said curling dies substantially tangent thereto.

14. A machine for forming metal plates, comprising a series of concave forming members, hard metal liners constituting the working faces of said members, means operative to traverse said members along a controlled path toward the longitudinal axis of a plate being operated upon, and means to cause the substantially flat portions of said plate to successively enter the edges of said members at approximate tangency thereto and to curl up around the working face of said members.

15. A machine for forming up metal plates, comprising a series of concave curling dies, means for insuring a controlled angular approach of said dies toward the general longitudinal axis of a plate being operated upon, means operative to force the substantially flat portions of said plate to enter said dies substantially edgewise and at approximate tangency, and further means for controlledly guiding the edge portions of such plate successively along the curling faces of said dies.

16. A machine for forming up metal plates, comprising a series of concave curling dies, means for insuring a controlled angular approach of said dies toward the general longitudinal axis of a plate being operated upon, means operative to force the substantially flat portions of said plate to enter said dies substantially edgewise and at approximate tangency, and further means for controlledly guiding the edge portions of such plate successively along the curling faces of said dies, there being low friction means for absorbing the major working thrusts of said dies during a large portion of their angular approach.

17. A machine for forming up metal plates, comprising a series of concave curling dies, means for insuring a controlled angular approach of said dies toward the general longitudinal axis of a plate being operated upon, means operative to force the substantially flat portions of said plate to enter said dies substantially edgewise and at approximate tangency, and further means for controlledly guiding the edge portions of such plate successively along the curling faces of said dies, said dies having renewable hard metal working faces.

18. A machine for forming up metal plates, comprising a series of concave curling dies, means for insuring a controlled angular approach of said dies toward the general longitudinal axis of a plate being operated upon, means operative to force the substantially flat portions of said plate to enter said dies substantially edgewise and at approximate tangency, and further means for controlledly guiding the edge portions of such plate successively along the curling faces of said dies, said dies having reversible liners constituting the working faces thereof.

19. Forming apparatus, comprising means adapted to cooperate with the opposite edges of a piece of skelp, at least one of said means comprising a series of longitudinally traveling forming members adapted to progressively curl one edge of the skelp, driving mechanism for effecting longitudinal movement of such means, and means cooperating directly with the edge portions of the skelp for positioning the same relatively to said forming members.

20. Forming apparatus, comprising means adapted to cooperate with the opposite edges of a piece of skelp, at least one of said means comprising a series of curling dies adapted to progressively curl one edge of the skelp, driving mechanism for such means, and means cooperating directly with the edge portions of the skelp for positioning the same relatively to said curling dies, said last mentioned means being resiliently mounted to compensate for variations in the width of the material being operated upon.

21. Forming apparatus, comprising a series of curling dies, means for moving said dies longitudinally, and edge positioning means within the path of travel of said dies for cooperation with the edges of the material being operated upon to control the path of travel thereof.

22. Forming apparatus, comprising a series of forming members progressively effective on the material to be formed from an edge thereof inwardly, means for moving said members longitudinally, and backing up means cooperating with said members during their longitudinal travel for positively controlling the path of movement thereof.

23. Forming apparatus, comprising forming members, and means for moving said forming members longitudinally while operative on the material being formed in a path departing from a predetermined axis both in a vertical direction and in a horizontal direction, said means being effective for positively controlling and defining the path through which the forming members travel.

24. An apparatus for forming a pipe from a metal sheet comprising two sets of forming members arranged to produce a V-shaped pass which is wide at its entrance and narrow at its exit and through which the sheet is moved and its opposite longitudinal edge portions are engaged by said forming members, endless carriers upon which said forming members are mounted, means for actuating said carriers so that said forming members move forward from the entrance to the exit of said pass, and means supporting said forming members on the outer sides thereof.

25. Forming apparatus, comprising means adapted to cooperate with the opposite edges of a piece of skelp, at least one of said means comprising a series of longitudinally traveling forming members adapted to progressively curl one edge of the skelp, and driving mechanism for such means, there being means within the zone of operation of said members for positioning the skelp relatively to said members and maintaining the same in the desired position to insure uniform forming thereof.

26. Forming apparatus, comprising means adapted to cooperate with the opposite edges of a piece of skelp, said means extending in gradually converging relationship and comprising opposed series of longitudinally traveling forming members adapted to progressively curl the edge portions of a piece of skelp, driving mechanism for said members, and means within the zone of operation of said members for positioning the skelp relatively to said members and maintaining the same in the desired position relatively thereto.

27. Forming apparatus, comprising a frame, guide rails carried thereby, forming members supported by said rails, endless carrier chains cooperating with said members for moving the same longitudinally of said rails, said carrier chains having both runs thereof lying in a common horizontal plane and embracing said rails, and roller supports cooperating with said members.

28. A forming machine for metal plates comprising a series of concave curling dies, a back support of predetermined contour longitudinally, to direct said dies and cause the same to travel through a distance many times the length of a single die in a direction generally convergent toward the longitudinal axis of a plate, and means cooperating with said dies and with said back support to provide an extended low friction support to said dies.

29. In a forming machine for metal plates, a series of concave curling dies, an endless carrier for said dies, and means for backing up and guiding said dies, said means having portions of different angularity to the axis of the plate being formed.

30. A forming machine for metal plates comprising a series of concave curling dies, endless means for moving said dies through a repetitive path, and means for guiding said dies, said means having an initial portion of considerable angularity to the axis of the plate, a portion of decreasing angularity, and a portion disposed to permit said dies to depart gradually from the formed plate.

31. An apparatus for forming a pipe from a metal sheet comprising two endless chain belts having their opposing operative stretches arranged to produce a forwardly narrowing V-shaped pass, and a plurality of forming members pivotally mounted on said belts and having concave peripheries adapted to engage the longitudinal edge portions of the sheet and bend the same gradually toward the axis thereof for converting the sheet into tubular form.

32. An apparatus for forming a pipe from a metal sheet comprising two endless chain belts having their opposing operative stretches arranged to produce a forwardly narrowing V-shaped pass, a plurality of forming members pivotally mounted on said belts and having concave peripheries adapted to engage the longitudinal edge portions of the sheet and bend the same gradually toward the axis thereof for converting the sheet into tubular form, said forming members lying side by side and providing a substantially continuous support for the edge portions of said sheets.

33. An apparatus for forming a pipe from a metal sheet comprising two endless chain belts having their opposing operative stretches arranged to produce a forwardly narrowing V-shaped pass, a plurality of forming members pivotally mounted on said belts and having concave peripheries adapted to engage the longitudinal edge portions of the sheet and bend the same gradually toward the axis thereof for converting the sheet into tubular form, sprocket wheels engaging with the turns of said belts, and means for driving said sprocket wheels.

34. An apparatus for forming a pipe from a metal sheet comprising two endless chain belts having their opposing operative stretches arranged to produce a forwardly narrowing V-shaped pass, a plurality of forming members pivotally mounted on said belts and having concave peripheries adapted to engage the longitudinal edge portions of the sheet and bend the same gradually toward the axis thereof for converting the sheet into tubular form, sprocket wheels engaging with the turns of said belts, a mounting for the sprocket wheels of each belt, means for backing up and supporting said members on the inner side thereof, and runners for supporting the belts from below.

35. An apparatus for forming a pipe from a metal sheet comprising two endless chain belts having their opposing operative stretches arranged to produce a forwardly narrowing V-shaped pass, a plurality of forming members pivotally mounted on said belts and having concave peripheries adapted to engage the longitudinal edge portions of the sheet and bend the same gradually toward the axis thereof for converting the sheet into tubular form, sprocket wheels engaging with the turns of said belts, a mounting for the sprocket wheels of each belt, means for backing up and supporting said members on the inner side thereof, runners for supporting the belts from below, and a motor operatively connected with the sprocket wheels.

36. An apparatus for forming a pipe from a metal sheet, comprising two endless chain belts having their opposing operative stretches arranged to produce a forwardly narrowing V-shaped pass, a plurality of forming members pivotally mounted on said belts and having concave peripheries adapted to engage the longitudinal edge portions of the sheet and bend the same gradually toward the axis thereof for converting the sheet into tubular form, sprocket wheels engaging with the turns of said belts, a mounting for the sprocket wheels of each belt, means for backing up and supporting said forming members, runners arranged for supporting the belts from below, worm wheels for turning said sprockets, a common worm shaft having worms engaging said worm wheels, and a motor for driving said shaft.

37. Apparatus for forming tubes from long, flat blanks, including a forming member, means continuously effecting guided movement of said member in a predetermined path including a substantially rectilinear portion converging toward a predetermined line, said movement being effective to advance a blank lengthwise and curl an edge thereof into a cylinder about said line as an axis.

JAMES L. ADAMS, Jr.